United States Patent Office 3,002,950
Patented Oct. 3, 1961

3,002,950
EPOXIDIZED ADDUCT OF A DICARBOXYLIC ACID AND A TRIALKENE, PROCESS OF MAKING AND COMPOSITION CONTAINING SAME
Charles S. Shull, Louisville, Ky., assignor to Devoe & Raynolds Company, Inc., a corporation of New York
No Drawing. Filed Jan. 8, 1958, Ser. No. 707,688
11 Claims. (Cl. 260—45.4)

This invention relates to the production of new materials suitable for use in various organic syntheses, such as the preparation of resins, coatings, varnishes, and the like.

In accordance with this invention an adduct containing an epoxide group as well as an anhydride group, or two carboxyl groups, or ester groups, etc., is provided which as an intermediate can be reacted with other compounds, or which, per se, can be converted to a clear, homogeneous, infusible resin. In addition to the adducts themselves, the adducts in combination with compounds containing various functional groups can be heat cured, forming compositions having a wide range of properties. Functional groups of such compounds should be those reactive groups which undergo reactions with an epoxide group, or an anhydride or carboxyl group, etc., as the case may be, especially compounds whose functional groups are hydroxyl groups. As an example, castings with physical properties ranging from hard and tough to soft and flexible can be made by heat curing a mixture of the adduct and a diol, increased flexibility generally depending upon the amount of diol employed and its molecular weight.

In accordance with the practice of this invention, the adduct is made from a triene having a conjugated system of double bonds and a non-terminal double bond separated therefrom by at least one methylene group; or with the diene resulting from the epoxidation of the non-terminal double bond of such a triene, the diene retaining two double bonds conjugated with respect to each other. The formation of the adduct depends upon the addition of an aliphatic dibasic acidic dienophile to the conjugated double bonds of the triene, or the epoxy diene, through a Diels-Alder reaction.

When a conjugated unsaturated monoepoxide is used as a starting material, the resulting adduct will contain one epoxide group. However, if the Diels-Alder reaction is carried out before the epoxidation, an adduct containing either one or two epoxide groups can be formed as desired. The Diels-Alder reaction creates a new, epoxidizable bond.

The Diels-Alder reaction is a well known reaction for the 1,4-addition of a single bond of a dienophile to a conjugated diene and hence need not be discussed at length herein. The reaction is carried out at a temperature of 0° C. to 150° C. and in many instances the reaction is so exothermic that it is necessary to remove rather than add heat. Pressure is usually not required but can be used if necessary. The reactants are generally heated slightly to start the reaction, and if the reaction is exothermic, heat removing means are provided.

Dienophilic compounds suitable for the Diels-Alder reaction with the conjugated monoepoxide, or the triene as the case may be, all contain the grouping

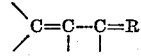

where R may be oxygen or nitrogen. For the preparation of the resinous products of this invention, the dienophile containing the above grouping should be a dibasic acid or simple derivative thereof. Although maleic anhydride is the preferred material for the reaction with the conjugated triene, or epoxide, other dienophilic compounds can be used, though not necessarily with equivalent results, for example, such acids as fumaric, mesaconic, citraconic, itaconic, etc. It is understood that aliphatic dibasic acidic dienophile includes not only the acids but their acid anhydrides, esters, amides or nitriles.

The adducts within the contemplation of this invention are thus made by Diels-Alder and epoxidation reactions. The epoxidized adduct can be made by first epoxidizing the isolated double bond of the triene and subsequently reacting the resulting monoepoxide with the dienophile by means of the Diels-Alder reaction; or the triene can be first reacted with the dienophile and then be epoxidized. The epoxidation of olefinically unsaturated organic compounds is commonplace, the method most adaptable to the preparation of the compounds of this invention being the peracid method. Particular epoxidation conditions, however, depend upon whether the epoxidation is carried out prior to or after the Diels-Alder condensation reaction. If the triene or substituted triene is epoxidized to form a monoepoxide which is subsequently reacted with the dienophile, the usual peracid epoxidation method can be used which involves the use of aqueous solutions of peracids, for example, peracetic acid, perbenzoic acid, performic acid, etc. The peracid can be formed in situ from glacial acetic acid, hydrogen peroxide and an acid type catalyst.

If a peracid epoxidizing agent is used in a non-aqueous, non-reactive solvent, such as methyl isobutyl ketone, the original isolated double bond can be epoxidized or both the isolated double bond and the double bond resulting from the Diels-Alder reaction can be epoxidized. The epoxidation results in the formation of a three membered ring, and the term "epoxide" or "monoepoxide" refers to such an oxirane group.

Other methods of epoxidation such as the acetaldehyde monoperacetate method described in U.S. 2,785,185 can, of course, also be used. Their use is especially desirable when the dienophile-triene condensate is first prepared. If the peracid contains water, other reactions are possible depending on the dienophile. Through the use of the acetaldehyde monoperacetate method, it is possible to epoxidize the previously referred to isolated double bond of the triene forming the triene-dienophile reaction product, thus preparing predominantly a monoepoxide. The acetaldehyde monoperacetate method also makes possible subsequent epoxidation of both double bonds to form the diepoxide from the triene-dienophile condensate.

The epoxidation is usually carried out at a low temperature, generally under 60° C. However, using the acetaldehyde monoperacetate method, higher temperatures can be used up to 200° C. Using peracids, the temperature generally will be −10° C. to 60° C. and the temperature using acetaldehyde monoperacetate will be in the range of 40° C. to 120° C., and can be as high as 200° C. It is thought that the acetaldehyde peracetate decomposes to acetaldehyde and peracetic acid, the peracetic acid epoxidizing the unsaturated compound.

This invention broadly contemplates the use of trienes or epoxidized trienes, i.e., epoxy dienes, having the required double bond system. The term "triene" encompasses hydrocarbons, ethers, ketones, and esters having three double bonds but free of other reactive groups. In other words, the trienes are devoid of reactive groups other than ether, carbonyl and acyl groups. Since in this triene the conjugated olefinic double bond system is separated from an isolated double bond by at least one methylene group, the isolated double bond is epoxidizable so long as it is non-terminal. The isolated double bond should also be separated from the ether, carbonyl, or acyl group, or the double bond by at least one methylene group. The triene molecule thus contains an isolated double bond and a conjugated system of double bonds separated from each other by a methylene group, and, if desired, an ether oxygen, a carbonyl group of an ester group; provided that if the molecule does contain an ether, carbonyl or ester linkage, there must be at least one methylene group separating such linkage from the isolated double bond.

In general, therefore, the invention includes hydrocarbons having conjugated olefinic unsaturation, and an isolated non-terminal double bond, esters formed from conjugated unsaturated alcohols and monounsaturated acids, esters formed from conjugated unsaturated acids and monounsaturated alcohols, as well as ethers and ketones in which the isolated double bond and the conjugated system of double bonds may or may not be separated by the ether oxygen, the carbonyl group or the acyl group. Each of these compounds is, of course, devoid of other reactive groups. Examples are 4-methyl-2,4,8-decatrien-6-one, 6-methyl-2,4,9-undecatrien-7-one, 3,5,10-dodecatrien-8-one, etc. In the case of the ether, when an adduct is desired having only one epoxide group, a glycidyl ether of a conjugated fatty alcohol is a suitable starting material. Glycidyl esters of conjugated fatty alcohols can also be used. Thus, it is seen that a wide variety of trienes or epoxy dienes is possible. It is understood, however, that esters, ethers, ketones, and hydrocarbons cannot be used with necessarily equivalent results. Selection of reactants will necessarily depend on the purpose for which the adduct is prepared.

Of the four classes of trienes available, preferred trienes are the hydrocarbons. Such trienes can best be exemplified by the following general formula:

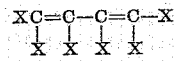

wherein one X is

—(CH$_2$)$_n$—CH=C—RR' in which $n$ represent a whole number, R is a hydrogen or alkyl group and R' is an alkyl group, and wherein the remaining Xs are hydrogen or alkyl groups. In these trienes, the R can readily be epoxidized to form

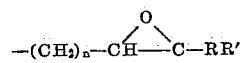

Examples of these trienes are 2,6,8-nonatriene-3,7-dimethyl, 2,4,8 - decatriene - 5,9 - dimethyl, 1,3,6-octatriene, 1,3,7-decatriene, 2,5,7-octatriene, 2,5,7-nonatriene, 2,6,8-nonatriene, 2,7,9-decatriene, 2,6,8-decatriene, 2,4,7-nonatriene, 3,5,8 - undecatriene, 3,5,9 - undecatriene, 2,4,9-undecatriene, etc. Particularly desirable results have been obtained with myrcene.

This invention can best be illustrated by reference to the following examples. In the examples, an epoxidized triene, epoxidized myrcene, will be used, the epoxidation being accomplished by the peracid method. Other trienes can, of course, be used in lieu of myrcene. The examples, however, are for the purpose of illustration and other variations and ramifications will become apparent from those given. As an example, the monoepoxide employed need not be purified but, for most purposes, can be used as an impure product having a particular weight per epoxide group. The myrcene employed in the following examples was epoxidized under conditions leading to the formation of myrcene monoepoxide (2-methyl-2,3-epoxy-6-methylene-7-octene), the isolated double bond being epoxidized. In the preparation of the epoxidized myrcene a mixture of two mols of commercial myrcene and 4.8 mols of sodium bicarbonate in benzene is treated with a solution of 1.5 mols of peracetic acid in 2.85 mols of acetic acid at 0–5° C. The impure product is distilled, producing fractions of product having different weights per epoxide, the refractionation yielding a product having a weight per epoxide of about 160, thus approaching

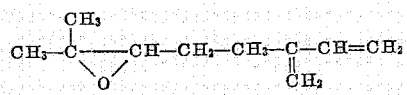

Since impure myrcene employed is used in the examples, the epoxidized myrcene will be identified in the examples by its weight per epoxide, a fraction boiling in the range of 24–34.8° C. at 0.7 to 0.15 mm. mercury having a weight per epoxide of 202, and another fraction boiling in the range of 34–45° C. at 0.8 to 0.13 mm. mercury having a weight per epoxide of 167.5. In another preparation, a fraction withdrawn at 32–35° C. at 0.10 mm. mercury yields a product having a weight per epoxide of 197. Iodine values of the three fractions show that they are still unsaturated. Using these three compositions, myrcene epoxide-maleic anhydride adducts are prepared and further reacted as illustrated in the examples.

EXAMPLE 1

*Epoxidized myrcene-maleic adduct*

Into a one liter, round bottomed, three necked flask fitted with an agitator, thermometer and dropping funnel are charged 50.0 grams of maleic anhydride and 125.0 grams of benzene. Agitation is initiated and the flask contents are cooled by means of an ice bath to 10° C., after which, over a period of two and a half hours, 80.0 grams of distilled fraction of epoxidized myrcene with a weight per epoxide of 197 and a theoretical weight per diene of 156.5 is slowly introduced into the flask. During the epoxide addition, care is exercised to maintain the reaction temperature at 5° C to 10° C., cooling when necessary with an ice bath. After all of the epoxidized myrcene is added, the reaction mixture is allowed to warm to room temperature over a period of an hour. The flask is then fitted for vacuum distillation and the benzene is distilled off at 0.3 mm. mercury at a temperature not exceeding 30° C. The epoxy-maleic adduct is obtained in a 96.5 percent yield (125.6 grams), has a weight per epoxide group of 263.8 and a weight per anhydride group of 319.2. The product is a pale yellow liquid with a viscosity of N (Gardner-Holdt). After standing at room temperature for 24 hours the viscosity is T-U, after two weeks the viscosity is Z$_4$ (Gardner-Holdt).

EXAMPLE 2

*Epoxidized myrcene-maleic adduct*

Into a 500 ml. three necked flask equipped with an agitator, thermometer and dropping funnel are weighed 54.8 grams of benzene and 18.2 grams of maleic anhydride. The flask contents are cooled to 18° C., and to the well agitated suspension of maleic anhydride in benzene are added, by means of the dropping funnel over a period of three hours, 36.6 grams of epoxidized myrcene with a weight per epoxide group of 197. The maleic anhydride is employed in a ratio of one mol of anhydride per mol of epoxide. During the addition of epoxidized myrcene the reaction temperature is held under 25° C. by cooling when necessary with an ice bath. After this addition is complete, the flask is fitted for vacuum distillation and at a pot temperature of 30° C., the volatile material is distilled off at 15 mm. mercury, followed by distillation for 50 minutes at 1 to 2 mm. mercury to remove the last traces of benzene. The epoxidized myrcene-maleic adduct is obtained in 95.6 percent yield and has a viscosity of Y (Gardner-Holdt) after storing for 16 hours at —10° C.

The adducts of this invention undergo reactions which are characteristic of epoxide groups and reactions characteristic of functional groups of the dienophile. The adducts containing only one oxirane or epoxide group per molecule can also be polymerized through the epoxide groups by the use of Friedel-Crafts catalysts, BF$_3$ complexes, and the like. The adducts contemplated herein react with themselves and with compounds containing active hydrogens such as amines, amides, alcohols, acids, etc. Amines react not only with the oxirane groups but preferentially with anhydride groups of dienophiles having such groups. The epoxide-anhydride adducts can be reacted with water to form compounds having two hydroxyl groups and two carboxyl groups. These hydroxy-carboxy compounds can then be further cross-linked by interesterification. Combinations of acids and alcohols can be reacted with adducts of this invention. The adduct can be reacted, for example, with a monohydric alcohol to form a monocarboxy-epoxy compound which can subsequently be homopolymerized to form a linear polymer containing an epoxide group and a carboxyl group. In addition to the preparation of epoxy containing polyesters, the anhydride group of the adduct can be reacted with two mols of an alcohol to form an epoxy-containing diester. The adducts prepared by the practice of this invention thus react with carboxylic acids, phenols, alcohols, mineral acids, water, amines, and the like, to form a variety of products. By way of illustration, Examples 3, 4 and 5 exemplify the reaction of the adduct with itself to form cured compositions and the formation of cured compositions by reaction of the adduct with various amines, amine salts or quaternary ammonium salts.

EXAMPLE 3

*Curing of adduct*

Into a 10.0 gram portion of the epoxy-maleic adduct of Example 1, in an aluminum cup, is blended 0.1 gram (1.0 weight percent) of a 60 percent aqueous solution of benzyltrimethyl ammonium chloride. The mixture is heated at 90° C. for 16 hours to obtain a well cured, hard casting.

EXAMPLE 4

*Curing of epoxidized myrcene-maleic adduct with amine*

In an aluminum cup, with 10.0 grams of the epoxidized myrcene-maleic adduct of Example 2 is combined 0.1 gram (1.0 weight percent) of dimethylaminomethyl phenol. The cup is placed in a 90° C. oven for 6 hours after which it is baked at 125° C. for 16 hours to obtain a hard, well cured casting.

EXAMPLE 5

*Curing of epoxidized myrcene-maleic adduct with amine*

In an aluminum cup, 9.3 grams (93.0 weight percent) of the epoxy-maleic adduct of Example 2 and 0.7 gram (7.0 weight percent) of tetraethylenepentamine are combined in the presence of 0.05 gram (0.5 percent based on the weight of the reactants) of dimethylaminomethyl phenol. The mixture is heated in a 75° C. oven for one hour and is then baked for 16 hours at 95° C. to obtain a hard, infusible casting.

In another of the embodiments of this invention, the adduct can be combined with a diol to form more flexible cured compositions. Cured compositions possessing a wide range of flexibility properties are possible depending upon the amount of diol and its molecular weight. Suitable diols for this purpose are 1,2-propanediol, 1,3-butanediol, 1,4-butanediol, 1,5-pentanediol, ethylene glycol, polyoxyethylene glycol, tetraethylene glycol, tetramethylene glycol, isobutylene glycol, hexylene glycol, and 1,12-dihydroxyoctadecane. Mixtures of diols are also contemplated. Polyoxyethylene glycol mixtures are readily available commercially. The term "diol" includes dihydric aliphatic alcohols and ethers containing only carbon, hydrogen and oxygen and free of oxygen-containing groups other than ether oxygen and hydroxyl groups. Generally, not more than forty weight percent of a diol having a molecular weight not exceeding 1000 is used, preferably from ten to thirty weight percent.

EXAMPLE 6

*Curing of adduct-glycol composition with amine*

In an aluminum cup, 7.5 grams (75.0 weight percent) of the epoxy-maleic adduct of Example 2 and 2.5 grams (25.0 weight percent) of polyethylene glycol with a molecular weight of 300 are combined in the presence of 0.1 gram (1.0 weight percent based on the weight of the reactants) of dimethylaminomethyl phenol and are baked at 90° C. for 6 hours followed by a 16 hour bake at 125° C. to obtain a clear and flexible casting.

In a particularly advantageous embodiment of this invention, the adduct contemplated herein can be blended with liquid ethoxyline resins to form lower viscosity ethoxyline resin compositions. The adduct has a marked effect on the viscosity of liquid epoxies producing low viscosity compositions even when as much as eightly percent of a liquid ethoxyline resin is employed in the blend. This makes possible the use of low viscosity polyepoxides in processes previously difficult to carry out because of the problems presented by viscous liquid ethoxyline resins. The invention has application to any of the known ethoxyline resins, from twenty to ninety-five weight percent adduct being used in combination therewith. An ethoxyline resin, or polyepoxide as it is often called, is a complex polyether derivative of a polyhydric organic compound, said derivative containing 1,2-epoxy groups. These ethoxyline compounds are resinous reaction products of epihalohydrins and alcohols or phenols having at least two alcoholic or phenolic hydroxyl groups. Their preparation is described in such patents as U.S. 2,467,171, 2,538,072, 2,582,985, 2,615,007 and 2,698,315. The liquid polyepoxide employed in the following examples is prepared from one mol of bisphenol and ten mols of epichlorhydrin in accordance with the procedure described in the aforementioned patents, and has a weight per epoxide of 190. This ethoxyline resin in the examples will be referred to as Epoxide 190.

EXAMPLE 7

*Curing of adduct-epoxy composition with amine*

In a suitable container, 10.0 grams (50.0 weight percent) of the epoxy-maleic adduct of Example 1 and 10.0 grams (50.0 weight percent) of Epoxide 190 are blended with 0.1 gram (0.5 weight percent based on the weight of the reactants) of dimethylaminomethyl phenol. The blend is heated at 75° C.–80° C. for one and a half hours during which time a gel results. Curing is accomplished by heating for an additional sixteen hours at 90° C. The casting obtained is well cured, hard and tough.

EXAMPLE 8

*Curing of epoxidized myrcene-maleic anhydride-polyepoxide composition with amine*

In a round bottomed flask fitted with a thermometer and agitator, 4.0 grams (10.0 weight percent) of the Epoxide 190 and 21.6 grams (54.0 weight percent) of epoxidized myrcene with a weight per epoxide of 202 are combined. Agitation is started and 14.4 grams (36.0 weight percent) of maleic anhydride (the epoxidized myrcene and maleic anhydride total 90.0 weight percent) are added gradually, care being exercised to maintain the reaction temperature below 30° C. by cooling when necessary with an ice bath. The maleic anhydride is present in a ratio of one mol of anhydride per mol of diene with a 5 percent excess. After the maleic anhydride is added, the homogeneous mixture is poured into a suitable container, 0.2 gram (0.5 percent based on the weight of the reactants) of dimethylaminomethyl phenol is blended in and the mixture is heated for sixteen hours at 125° C. to obtain a hard, well cured casting.

A desirable curable epoxide resin composition is a mixture of an ethoxyline resin and a polyhydric alcohol, particularly a diol such as polyoxyethylene glycol. In still another aspect of this invention, the adduct can be used to thin such alcohol-ethoxyline resin mixtures, reducing the viscosity and thereby broadening their field of use. This embodiment of the invention is illustrated by the following examples, any of the diols previously mentioned herein being suitable for use in such compositions.

EXAMPLE 9

*Curing of adduct-diol-polyepoxide composition with amine*

In a suitable container, 14.0 grams (70.0 weight percent) of the epoxy-maleic adduct of Example 1 and 2.0 grams (10.0 weight percent) of 1,4-butanediol are combined with 4.0 grams (20.0 weight percent) of the Epoxide 190. To this blend is added 0.1 gram (0.5 weight percent based on the weight of the reactants) of dimethylaminomethyl phenol. The mixture is heated over a period of one hour to 120° C. until a clear solution is obtained whereupon the solution is poured into an aluminum cup and is baked for 10 hours at 120° C. The casting obtained is well cured, clear, very hard and tough, and has a good color.

EXAMPLE 10

*Curing of adduct-diolpolyepoxide composition with amine*

A clear, very hard, tough and flexible casting is prepared, as described in the procedure of Example 9, from the combination of 10.0 grams (50.0 weight percent) of the epoxy-maleic adduct of Example 1, 2.0 grams (10.0 weight percent) of 1,4-butanediol, 8.0 grams (40.0 weight percent) of the Epoxide 190 and 0.1 gram (0.5 weight percent based on the weight of the reactants) of dimethylaminomethyl phenol baked at 120° C. for ten hours.

EXAMPLE 11

*Curing of adduct-glycol-polyepoxide composition with amine*

In an aluminum dish, 12.4 grams (60.8 weight percent) of the epoxy-maleic adduct of Example 1, 6.0 grams (29.4 weight percent) of polyethylene glycol with a molecular weight of 300 and 2.0 grams (9.8 weight percent) of the Epoxide 190 are combined and blended together in the presence of 0.1 gram (0.5 weight percent based on the weight of the reactants) of dimethylaminomethyl phenol. The blend is heated to 125° C. and is maintained at this temperature for five hours during which time a gel is formed. The gel is baked for one and a half hours at 180° C. to obtain a clear, well cured, flexible casting of good color.

EXAMPLE 12

*Curing of adduct-glycol-polyepoxide composition with amine*

According to the procedure of Example 9, 14.0 grams (70.0 weight percent) of the epoxy-maleic adduct of Example 1, 4.0 grams (20.0 weight percent) of polyethylene glycol with a molecular weight of 300 and 2.0 grams (10.0 weight percent) of the Epoxide 190 are combined in the presence of 0.1 gram (0.5 weight percent based on the reactants) of dimethylaminomethyl phenol. The blend is heated at 110° C. for four hours to obtain a gel, after which it is baked at 180° C. for two hours to obtain a well cured, hard, clear and tough casting with good impact resistance.

EXAMPLE 13

*Curing of adduct-glycol-polyepoxide composition with amine*

In a suitable container, 14.0 grams (63.7 weight percent) of the epoxy-maleic adduct of Example 1 and 6.0 grams (27.3 weight percent) of polyethylene glycol with a molecular weight of 600 are combined and heated to 90° C. for one hour. The mixture is cooled to room temperature, 2.0 grams (9.0 weight percent) of the Epoxide 190 are added and the blend is allowed to stand at room temperature for one half hour, after which it is heated to 90° C. over a period of one half hour and 0.11 gram (0.5 weight percent based on the weight of the reactants) of dimethylaminomethyl phenol is added. The mixture is heated to 100° C. and held at this temperature for two hours to obtain a gel, after which it is heated, over a one half hour period to 150° C. and is baked at that temperature for two hours. The casting obtained is well cured, hard and tough, has fair flexibility and very good impact resistance properties.

EXAMPLE 14

*Curing of epoxidized myrcene-maleic-polyepoxide-glycol composition with amine*

In a round bottomed flask fitted with a thermometer and agitator, 4.0 grams (20.0 weight percent) of polyethylene glycol with a molecular weight of 300, 2.0 grams (10.0 weight percent) of the Epoxide 190 and 8.6 grams of epoxidized myrcene with a weight per epoxide of 197 are combined. Agitation is started and 5.4 grams of maleic anhydride (the epoxidized myrcene and maleic anhydride total 70.0 weight percent) are added gradually, care being exercised to maintain the reaction temperature below 30° C. by cooling when necessary with an ice bath. On preparation, the product is a light colored liquid with a viscosity of R (Gardner-Holdt). With this product is mixed 0.10 gram (0.5 percent based on the weight of the reactants) of the dimethylaminomethyl phenol, the solution is poured into an aluminum cup and is heated for four hours at 85° C. (a gel results after three hours), one hour at 95° C., one half hour at 107° C., one half hour at 120° C. followed by a bake at 125° C. for sixteen hours to result in a well cured, hard, amber colored casting.

EXAMPLE 15

*Curing of epoxidized myrcene-maleic-glycol-polyepoxide composition with amine*

Following the procedure of Example 14, 4.0 grams (10.0 weight percent) of the Epoxide 190 and 6.0 grams (15.0 weight percent) of polyethylene glycol with a molecular weight of 300 are combined with 18.0 grams of epoxidized myrcene with a weight per epoxide of 202 and 12.0 grams of maleic anhydride (the myrcene epoxide and maleic anhydride total 75.0 weight percent, the maleic anhydride being employed in a ratio of one mol per mol of diene with a 5 percent excess). To this reaction mixture is added 0.2 gram (0.5 percent based on the weight of the reactants) of dimethylaminomethyl phenol. The mixture is poured into an aluminum cup and is heated for three and a half hours at 90° C., followed by one half hour at 100° C., one hour at 125° C. and two hours at 150° C. to obtain a well cured, hard and clear casting.

EXAMPLE 16

*Curing of epoxidized myrcene-maleic-glycol-polyepoxide composition with amine*

As outlined in the procedure of Example 14, 4.0 grams (10.0 weight percent) of the Epoxide 190 and 12.0 grams (30.0 weight percent) of polyethylene glycol with a molecular weight of 300 are combined with 14.4 grams of epoxidized myrcene with a weight per epoxide of 202 and 9.6 grams of maleic anhydride (epoxidized myrcene and maleic anhydride total 60.0 weight percent, the maleic anhydride being present in a ratio of one mol of anhydride per mol of diene with a 5 percent excess). To this is added 0.2 gram (0.5 percent based on the weight of the reactants) of dimethylaminomethyl phenol. The mixture is poured into an aluminum cup and is baked at 90° C. for three and a half hours, followed by one half hour at 100° C., one hour at 125° C. and two and a half hours at 150° C. to obtain a flexible, well cured casting.

EXAMPLE 17

*Curing of epoxidized myrcene-maleic-glycol-polyepoxide composition with amine*

Following the procedure of Example 14, 3.0 grams (15.0 weight percent) of the Epoxide 190, 3.0 grams (15.0 weight percent) of polyethylene glycol with a molecular weight of 600, 8.6 grams of fractionated epoxidized myrcene (weight per epoxide of 202 and weight per diene of 154), and 5.4 grams of maleic anhydride (a total of 70.0 weight percent of myrcene epoxide and maleic anhydride, the anhydride being present in a ratio of one mol of anhydride per mol of diene) are combined. To this is added 0.1 gram (0.5 weight percent based on the weight of the reactants) of dimethylaminomethyl phenol. The mixture is poured into an aluminum cup and is baked at 90° C. to 95° C. for one and a half hours, at which time a gel is obtained. Heating is continued at 95° C. for an additional one half hour, after which the temperature is raised over a period of one hour to 150° C. and is held at 150° C. for one hour. A well cured, hard casting is obtained.

It has been pointed out that the adduct of this invention undergo a multiplicity of reactions to form a wide variety of compositions. A number of reactions have been illustrated by means of examples, and others will occur to those working with these adducts. It is understood, for example, that a compound containing both carboxyl and epoxide groups is not stable because of the possible carboxy-epoxy reaction. Likewise, a compound containing epoxide and anhydride groups is not infinitely stable because moisture and other contaminants open the anhydride ring to form carboxyl groups which can cause the adduct of this invention to react with itself. It has been found, however, that the epoxy diene-anhydride adduct can be stabilized by the addition thereto of a monoisocyanate in an amount of from two to twenty weight percent. Toluene isocyanate and ethyl isocyanate are particularly useful as stabilizers. Using twelve weight percent ethyl isocyanate, for example, the increase in viscosity with time was greatly inhibited. Other monoisocyanates can, of course, be used, for example, phenyl isocyanate, butyl isocyanate, alpha-methyl isocyanate, alpha-naphthalene isocyanate, and other alkyl and aryl monoisocyanates of not more than twelve carbon atoms. In view of the foregoing illustrations and discussion, it will be obvious to one skilled in the art that there are many other modifications or variations possible in the light of the teachings of this invention. Such modifications are to be considered within the scope of this invention.

What is claimed is:

1. A process for the formation of a resin intermediate which comprises at a temperature below 150° C. reacting an aliphatic dicarboxylic acidic dienophile selected from the group consisting of maleic, fumaric, mesaconic, citraconic, itaconic acids and anhydrides and an epoxy alkene having one oxirane group and conjugated olefinic unsaturation.

2. A process for the formation of a resin intermediate which comprises at a temperature below 150° C. reacting an aliphatic dicarboxylic acidic dienophile selected from the group consisting of maleic, fumaric, mesaconic, citraconic, itaconic acids and anhydrides and a monoepoxide having one oxirane group resulting from the epoxidation of a non-terminal double bond of an alkene having, in addition to the non-terminal epoxidizable double bond, an olefinic conjugated system of double bonds separated from the non-terminal double bond by at least one methylene group.

3. The process of claim 2 wherein the dieneophile is maleic anhydride and the monoepoxide is myrcene monoepoxide.

4. An epoxidized adduct of an aliphatic dicarboxylic acidic dienophile selected from the group consisting of maleic, fumaric, mesaconic, citraconic, itaconic acids and anhydrides, and a trialkene having a non-terminal double bond separated by at least one methylene group from a conjugated olefinic double bond system.

5. The epoxy substituted adduct of claim 4 having one epoxide group per molecule.

6. The epoxy substituted adduct of claim 4 having more than one epoxide group per molecule.

7. The product of claim 4 wherein the dienophile is maleic anhydride and the trialkene is myrcene.

8. A composition of matter comprising in admixture the epoxy substituted adduct of claim 4 and 5 to 80 percent by weight of a diglycidyl ether of a polyhydric phenol.

9. A composition of matter comprising in admixture the adduct of claim 4 and from two to twenty percent by weight of an alkyl isocyanate sufficient to stabilize the composition.

10. A composition of matter comprising in admixture the epoxy substituted adduct of claim 4 with from five to forty percent by weight of a dihydric alcohol.

11. A composition of matter comprising from 90 to 20 percent by weight of an epoxidized adduct of maleic acid anhydride and myrcene, in admixture with 5 to 30 percent by weight of a glycol and from 5 to 50 percent by weight of a glycidyl polyether of a polyhydric phenol.

References Cited in the file of this patent

UNITED STATES PATENTS

| | | |
|---|---|---|
| 2,347,970 | Rummelsburg | May 2, 1944 |
| 2,512,996 | Bixler | June 27, 1950 |
| 2,733,248 | Lidov | Jan. 31, 1956 |
| 2,865,931 | Mack et al. | Dec. 23, 1958 |

OTHER REFERENCES

Hoffman et al.: "New Tung Oil Derivatives," United States Department of Agriculture, ARS–72–7, December 1956.

Rudakov et al.: Zhur. Priklad. Khim, 28, 1199–1204 (1955), condensed in 50 Chem. Abstracts 9338.